(12) United States Patent
Arroyo

(10) Patent No.: US 11,006,582 B2
(45) Date of Patent: May 18, 2021

(54) INTERLOCKING TONGUE AND GROOVE VEGETATION PLANTING ASSEMBLY

(71) Applicant: Patricia Arroyo, Pasadena, CA (US)

(72) Inventor: Patricia Arroyo, Pasadena, CA (US)

(*) Notice: Subject to any disclaimer, the term of this patent is extended or adjusted under 35 U.S.C. 154(b) by 223 days.

(21) Appl. No.: 16/425,232

(22) Filed: May 29, 2019

(65) Prior Publication Data

US 2020/0375119 A1    Dec. 3, 2020

(51) Int. Cl.
*A01G 9/02* (2018.01)
*B65D 21/02* (2006.01)

(52) U.S. Cl.
CPC ............ *A01G 9/022* (2013.01); *A01G 9/027* (2013.01); *B65D 21/0235* (2013.01)

(58) Field of Classification Search
CPC . A01G 9/00; A01G 9/02; A01G 9/022; A01G 9/023; A01G 9/027; A01G 9/028; A01G 9/0295
See application file for complete search history.

(56) References Cited

U.S. PATENT DOCUMENTS

| | | | | |
|---|---|---|---|---|
| 3,137,095 A | * | 6/1964 | Pearson | A01G 9/023 47/83 |
| 4,355,485 A | * | 10/1982 | Frank | A01G 9/023 47/82 |
| 8,978,300 B2 | * | 3/2015 | Keats | A01G 9/023 47/83 |
| 9,332,695 B2 | * | 5/2016 | Hwang | A01G 9/022 |
| 10,863,679 B2 | * | 12/2020 | Tyink | A01G 7/045 |
| 2010/0154301 A1 | * | 6/2010 | Song | A01G 9/022 47/66.7 |
| 2011/0247268 A1 | * | 10/2011 | Adams | A01G 9/1423 47/66.1 |
| 2015/0101540 A1 | * | 4/2015 | Allen | A01K 63/06 119/247 |
| 2015/0121755 A1 | * | 5/2015 | Caird | A01G 9/028 47/66.7 |
| 2018/0352761 A1 | * | 12/2018 | Hall | A01G 9/029 |
| 2021/0015054 A1 | * | 1/2021 | Homsri | A01G 9/023 |

* cited by examiner

*Primary Examiner* — Kristen C Hayes

(57) ABSTRACT

An interlocking tongue and groove vegetation planting assembly provides a self-supporting arrangement of pentagon-shaped plant containers and triangle-shaped plant containers that are alternatively stacked, and detachably fitted together with support blocks having a central tongue on one end and a pair of legs on an opposite end that fit together in a tongue-and-groove relationship through the support sleeve. Both the pentagon-shaped and triangle-shaped plant containers include a plant chamber, and an adjacent support sleeve. The plant chamber has multiple sidewalls sloped at an angle. The plant chamber also has a floor wall that forms drainage holes near the junction of the plant chamber and the support sleeve sidewalls. The pentagon-shaped plant container is half the width and length of the triangle-shaped plant container to allow sunlight to reach lower stacked triangle-shaped plant chambers. The tongue-and-groove stacking arrangement creates multiple points of contact throughout each sidewall for equal weight distribution.

20 Claims, 13 Drawing Sheets

INTERLOCKING TONGUE AND GROOVE VEGETATION PLANTING ASSEMBLY

FIELD OF THE INVENTION

The present invention relates generally to an interlocking tongue and groove vegetation planting assembly. More so, the present invention relates to a planting assembly that provides multiple pentagon-shaped and triangle-shaped plant containers that are alternatively stacked in a vertical arrangement, and detachably fitted together with multiple support blocks having a central tongue on one end and a pair of legs on an opposite end that fit together in a snug relationship; whereby the plant containers comprises a support sleeve and a plant chamber having multiple sidewalls and a floor wall that forms at least one drainage hole; whereby the sidewalls are sloped at an angle; whereby the pentagon-shaped plant container is half the width and length of the triangle-shaped plant container, so as to enable sunlight to reach the lower triangle-shaped plant chamber; whereby the central upper tongue and the pair of spaced-apart lower legs of the support blocks connect through the support sleeve of the plant chambers to support the plant containers in the vertical arrangement.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, container planting systems have involved individual ceramic or terracotta pots in many forms that are meant to be displayed either flat on the ground, on elevated plant stands or outdoor shelving units. Additionally, most methods for forming these pots are dependent on using hand crafted pottery techniques that must then be fired in a kiln and glazed, causing there to be multiple steps to be involved to achieve a finished product. There is an increasing demand and need for planting systems that meet the often-limited spatial availability of hobby plant keepers while providing optimal growing conditions for various species of plants. Currently, most vertically integrated growing systems on the market involve support mechanisms that are separate from the planters, causing there to be multiple parts to be necessary in order to assemble a complete growing unit.

Though there have been advancements on the types of planters available to modern gardeners there are still some aspects regarding the construction and usage of space that have not been addressed. In U.S. Pat. No. 8,261,913 B2 in the name Stackapots Pty Ltd a stackable planting system is described in which planters in a radial shape are meant to be stacked by offsetting alternating planters around a central cavity that includes a water catchment system. The functionality of the stacking mechanism mentioned is limited to shallow interconnecting pot leg structures and depressions in the base of each planter, who's stability is largely contingent on each of the planting regions being filled with an equal weight.

In order to secure the base of the stacked planting structure, a separate saucer must be used to snap the legs of the bottommost planter in place, meaning that in order for the bottommost plants to be changed out, the entire system must be taken apart. Additionally, since the planters are arranged in a radial shape, the entire system must be placed strategically in order for all of the included plants to receive the amount of sunlight necessary to maintain optimal growth, limiting the space where the planters can be situated Other proposals have involved vertical plant units. The problem with these planting systems is that they do not align the drainage holes and sidewalls. Also, the stacking component does not distribute weight evenly along the sidewalls. Even though the above cited vertical planting systems meets some of the needs of the market, an interlocking tongue and groove vegetation planting assembly is still desired.

SUMMARY

Illustrative embodiments of the disclosure are generally directed to an interlocking tongue and groove vegetation planting assembly. The interlocking tongue and groove vegetation planting assembly provides a self-supporting arrangement of pentagon-shaped plant containers and triangle-shaped plant containers that are alternatively stacked in a vertical arrangement, and detachably fitted together with multiple support blocks having a central tongue on one end and a pair of legs on an opposite end that fit together in a snug relationship. The plant containers are supported by support blocks that fit into the plant containers in a snug, tongue-and-groove relationship, enabling separate columns of plant containers to be freestanding with additional support components.

Both the pentagon-shaped and triangle-shaped plant containers include a plant chamber, and an adjacent support sleeve. The plant chamber has multiple sidewalls sloped at an angle. The angled disposition of the sidewalls at an upper pentagon-shaped plant container allows sunlight to reach the plant chamber of a lower triangle-shaped plant container. The plant chamber also has a floor wall that forms at least one drainage hole proximal to the junction of the sidewalls of the plant chamber and the support sleeve. The pentagon-shaped plant container is half the width and length of the triangle-shaped plant container, so as to enable sunlight to reach the lower stacked triangle-shaped plant chamber.

The central upper tongue and the lower legs of the support blocks connect through the support sleeve of the plant chambers to support the plant containers in the vertical arrangement. The tongue-and-groove stacking arrangement also creates multiple points of contact throughout each sidewall for each plant containers, so that the points of weight stress are equally distributed.

In one aspect, an interlocking tongue and groove vegetation planting assembly, comprises:
  multiple pentagonal plant containers comprising a pentagon-shaped plant chamber and a pentagon support sleeve disposed in an adjacent relationship,
  the pentagon support sleeve for the pentagonal plant containers being defined by an upper section and a lower section, the support sleeve further being defined by multiple sleeve sidewalls,
  the pentagon-shaped plant chamber being defined by multiple chamber sidewalls forming a hollow interior, the pentagon-shaped plant chamber further being defined by a floor wall forming at least one drainage hole;
  multiple triangular plant containers comprising a triangle-shaped plant chamber and a triangle support sleeve disposed in an adjacent relationship, the triangle support sleeve for the triangular plant containers being defined by an upper section and a lower section, the support sleeve further being defined by multiple sleeve sidewalls, the triangle-shaped plant chamber being defined by multiple chamber sidewalls forming a hollow interior, the triangle-shaped plant chamber further being defined by a floor wall forming at least one drainage hole, multiple support blocks comprising a central upper tongue detachably mated in a snug relationship with the lower section of the support sleeve, the support blocks further comprising a pair of spaced-apart lower legs detachably mated in a snug relationship with the upper section of the support sleeve, whereby the central upper tongue detachably of a lower support block mates in a snug relationship with the lower legs of an adjacent upper support block, whereby the support blocks retain the plant containers in a stacked, self-supporting arrangement of plant containers, whereby when the plant chambers are in a stacked arrangement, at least a portion of the chamber sidewalls of the pentagon-shaped plant chamber align in a coplanar relationship with the chamber sidewalls of the triangle-shaped plant chamber.

In another aspect, the multiple sleeve sidewalls form a rectangular shape.

In another aspect, the multiple chamber sidewalls of the pentagon-shaped plant container comprise four chamber sidewalls.

In another aspect, the chamber sidewalls of the triangle-shaped plant container comprise two chamber sidewalls.

In another aspect, the chamber sidewalls have a tapered upper edge.

In another aspect, the drainage hole of the pentagon-shaped plant chamber is being disposed proximal to the junction of the sleeve sidewalls and chamber sidewalls.

In another aspect, the at least one drainage hole of the pentagon-shaped plant chamber is centrally disposed in the floor wall.

In another aspect, the at least one drainage hole of the pentagon-shaped plant chamber and the triangle-shaped plant chamber are defined by a triangular shape.

In another aspect, the at least one drainage hole of the pentagon-shaped plant chamber and the triangle-shaped plant chamber are grated.

In another aspect, the support blocks engage a substantial surface area of the sleeve sidewalls.

In another aspect, when the plant chambers are in a stacked arrangement, the drainage holes of the pentagon-shaped plant chamber align with the drainage holes of the triangle-shaped plant chamber.

In another aspect, the pentagon-shaped plant chamber has half the width of the triangle-shaped plant chamber.

In another aspect, the pentagon-shaped plant chamber has half the length of the triangle-shaped plant chamber.

In another aspect, the chamber sidewalls of the pentagon-shaped plant chamber and the triangle-shaped plant chamber slope downwardly about 75 degrees.

In another aspect, the chamber sidewalls of the pentagon-shaped plant chamber and the triangle-shaped plant chamber have a thickness of about ¼ inches.

One objective of the present invention is to stack an alternating arrangement of pentagon-shaped plant containers and triangle-shaped plant containers for optimal plant growth, sunlight passage, and nutrient and water distribution.

Another objective is to create a tongue-and-groove interconnection between the plant containers.

Yet another objective is to slope the wall of the plant containers.

Yet another objective is to reduce the length and width of the pentagon-shaped plant container so that sunlight can reach the lower triangle-shaped plant container.

Yet another objective is to fabricate the plant containers from materials that can be reduced to a liquid state and solidified within a mold including concrete, plaster, clays, resin, recycled plastics, metals and any composite wherein.

Yet another objective is to provide a planting arrangement that is anchored by a flat wall, instead of a radial arrangement means that assemblages of planters can readily be moved and rearranged.

Yet another objective is to provide an inexpensive to manufacture interlocking tongue and groove vegetation planting assembly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

DETAILED DESCRIPTION OF THE INVENTION

Figure 1:
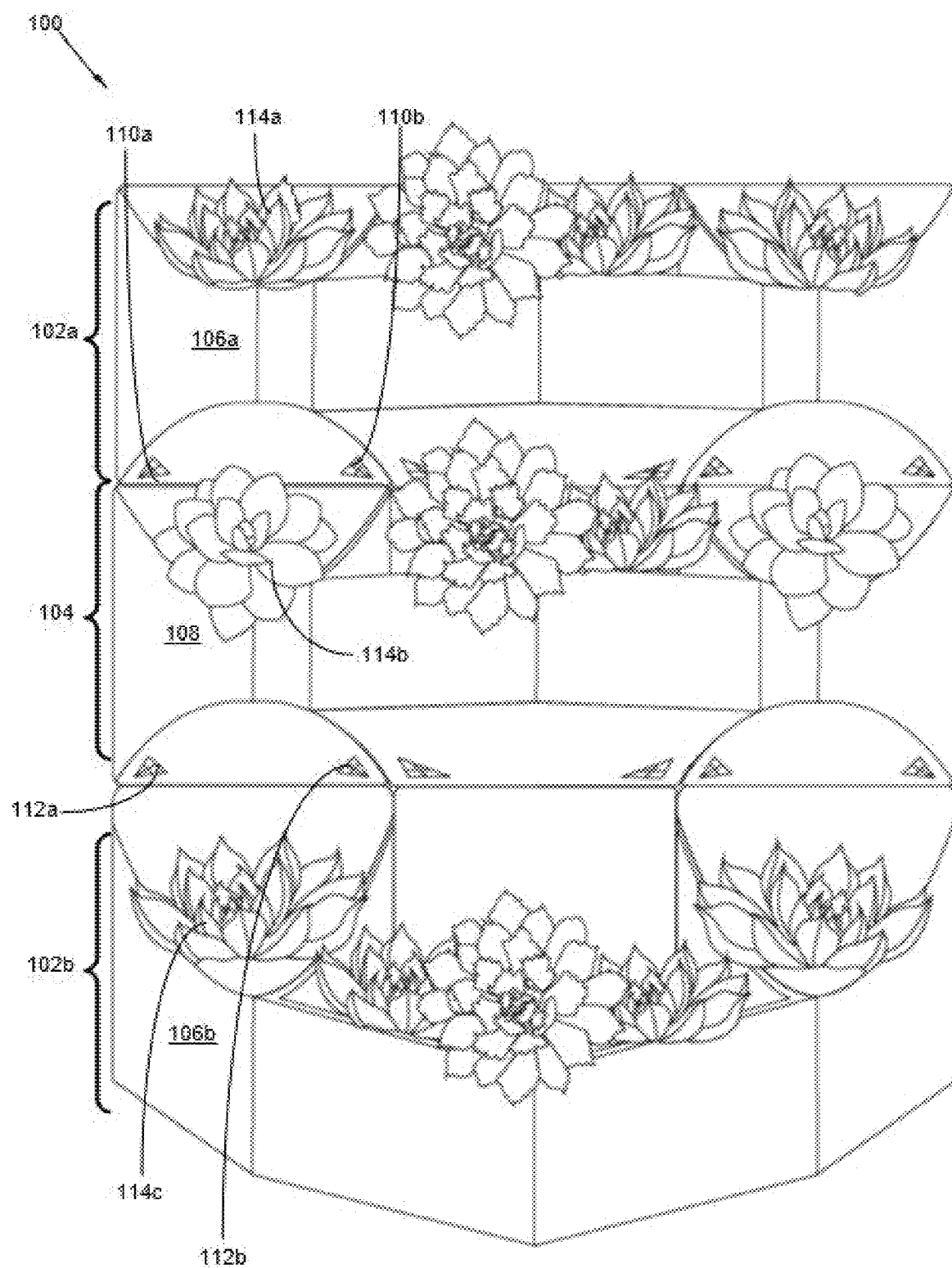
FIG. 1 illustrates an isometric view of an exemplary interlocking tongue and groove vegetation planting assembly, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper, "lower," "left,' rear,' 'right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An interlocking tongue and groove vegetation planting assembly 100 is referenced in FIGS. 1-13. The interlocking tongue and groove vegetation planting assembly 100 is a unique vegetation planting assembly 100 that arranges multiple pentagonal and triangular plant containers 102a-b, 104 in a stacked, self-supporting arrangement. Each of the plant containers 102a-b, 104 includes a plant chamber 106a-b, 108 that accommodates nutrients, soil, and water to create optimal growing conditions and sustain continual health for the vegetation. The vegetation 114a-c may include, without limitation, flowers, house plants, vegetables, fruits, perennials, and hydroponic plants. The pentagon-shaped plant chamber 106a-b is half the width and length of the triangle-shaped plant chamber 108, so as to enable sunlight to reach the lower stacked triangle-shaped plant chamber 108.

Furthermore, the interlocking tongue and groove vegetation planting assembly 100 hereafter, "assembly 100" utilizes unique support blocks 214 that detachably mate through a support sleeve that forms in the plant containers, so as to retain the plant containers in a stacked, self-supporting arrangement. The support blocks 214 are defined by a central upper tongue 216 on one end, and a lower pair of spaced-apart legs 218a, 218b on an opposite end of the support block. The tongue and legs 218a, 218b detachably mate in a snug relationship through a support sleeve that forms in each plant container. The tongue-and-groove stacking arrangement also creates multiple points of contact throughout each sidewall for each plant containers, so that the points of weight stress are equally distributed between the plant containers and the support blocks 214.

The plant chamber has multiple sidewalls sloped at an angle. The angled disposition of the sidewalls at an upper pentagon-shaped plant container allows sunlight to reach the plant chamber of a lower triangle-shaped plant container. The plant chamber also has a floor wall that forms at least one drainage hole proximal to the junction of the sidewalls of the plant chamber and the support sleeve.

Figure 2:
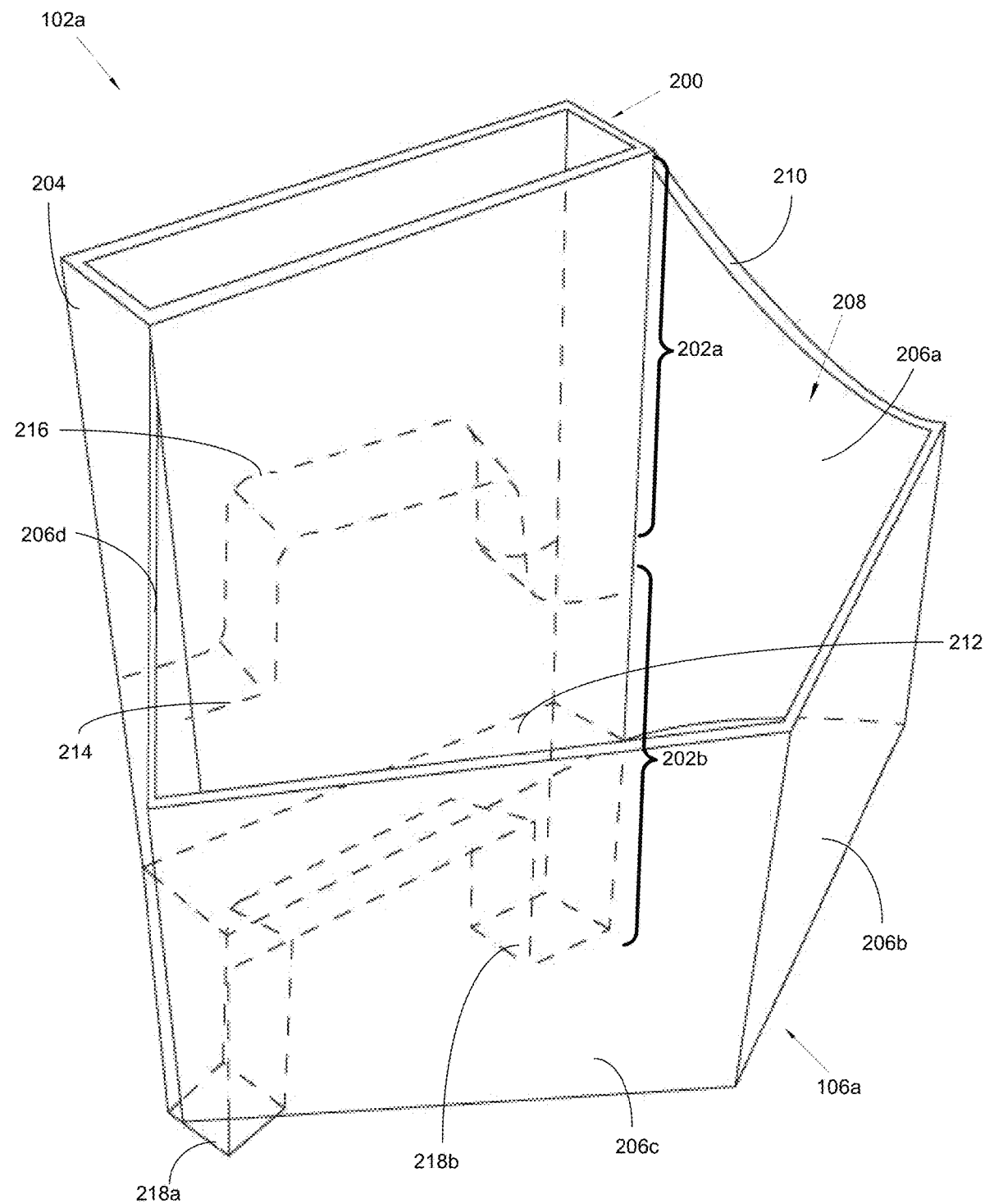
FIG. 2 illustrates an isometric view of an exemplary pentagonal plant chamber, in accordance with an embodiment of the present invention.

As referenced in FIG. 2, the assembly 100 comprises multiple pentagonal plant container 102a, 102bs for containing at least one vegetation and stacking with other plant containers. The pentagonal plant container 102a, 102bs include a pentagon-shaped plant chamber 106a, 106b for holding nutrients, water, and the vegetation. The pentagonal plant container 102a, 102bs also include a pentagon support sleeve 200 for stacking. The pentagon support sleeve 200 is adjacent to the pentagon-shaped plant chamber 106a, 106b, forming a buttressing wall there against to complete the pentagon shape.

Figure 3:
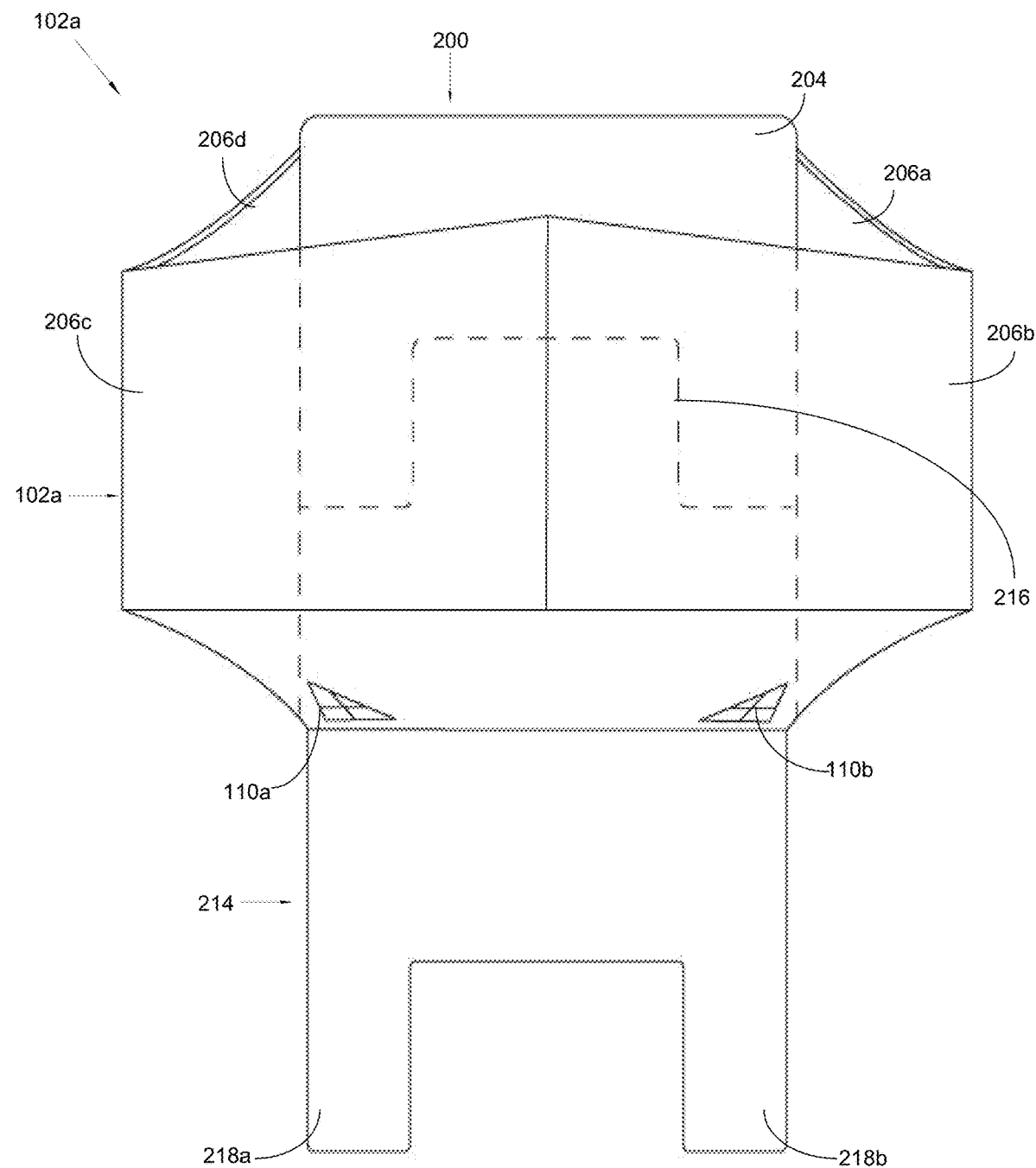
FIG. 3 illustrates a frontal view of the pentagonal plant chamber, in accordance with an embodiment of the present invention.

As FIG. 3 shows, the pentagon support sleeve 200 is defined by an upper section 202a and a lower section 202b. The upper section 202a may be oriented at a higher elevation than the lower section 202b. The pentagon support sleeve 200 is also defined by multiple rectangular-shaped sleeve sidewalls 204. In one non-limiting embodiment, the sleeve sidewalls 204 of the pentagon support sleeve 200 form a rectangular shape. The sleeve sidewalls 204 form one wall of the pentagon shaped chamber 106a-b.

Figure 4:
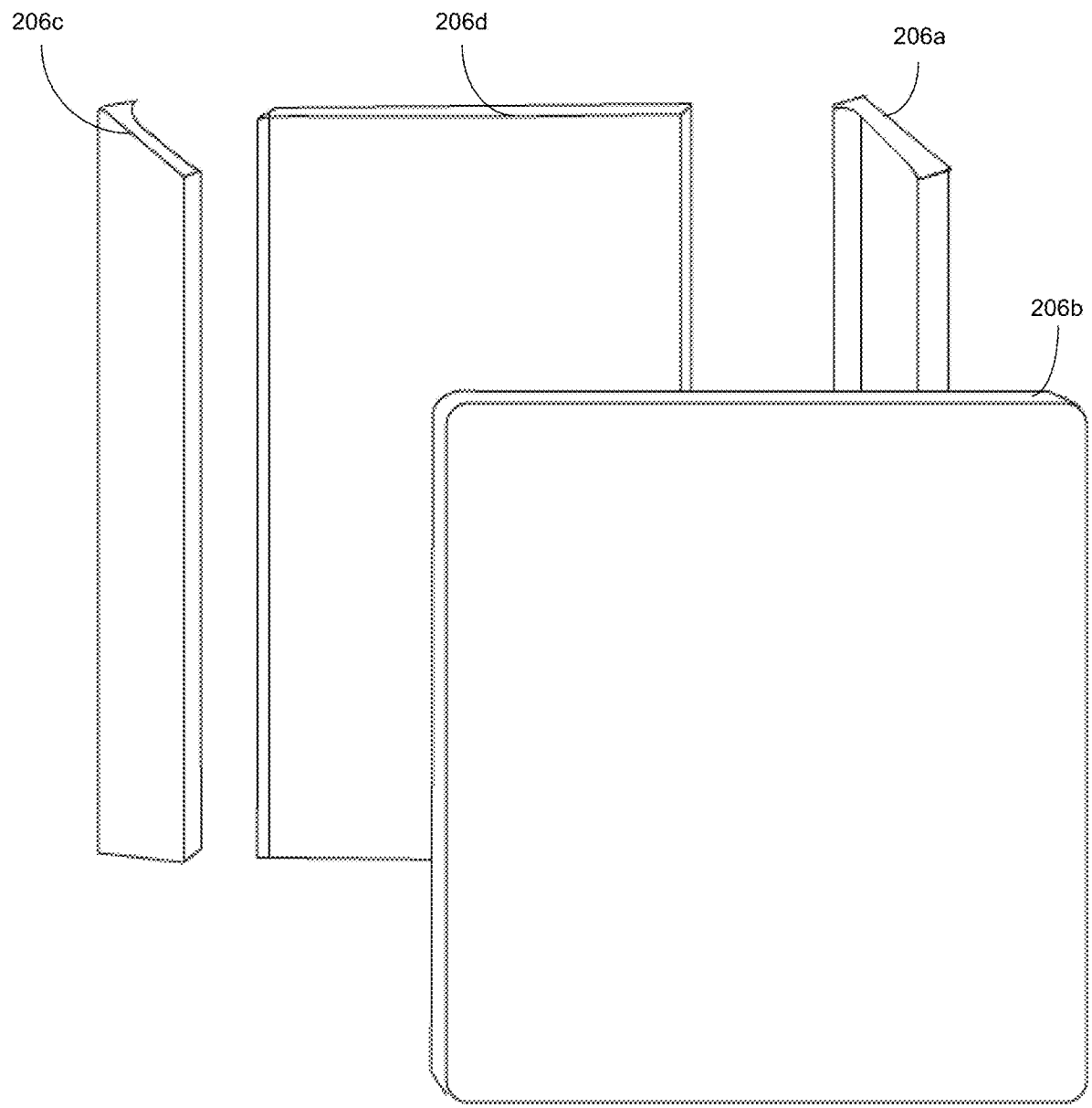
FIG. 4 illustrates a perspective view of chamber sidewalls of the pentagonal plant chamber, in accordance with an embodiment of the present invention.

Turning now to FIG. 4, the pentagon-shaped plant chamber 106a, 106b has multiple chamber sidewalls 206a, 206b, 206c, 206d that form a hollow interior 208. The interior 208 is sized to contain the soil, water, and vegetation 114a-c. The chamber sidewalls 206a-d may include four chamber sidewalls that buttress the sleeve sidewalls 204 to create the pentagon shape. In one non-limiting embodiment, the chamber sidewalls 206a-d have a tapered upper edge 210. In some embodiments, the chamber sidewalls 206a-d of the pentagon-shaped plant chamber 106a, 106b have a thickness of about ¼".

Figure 5:
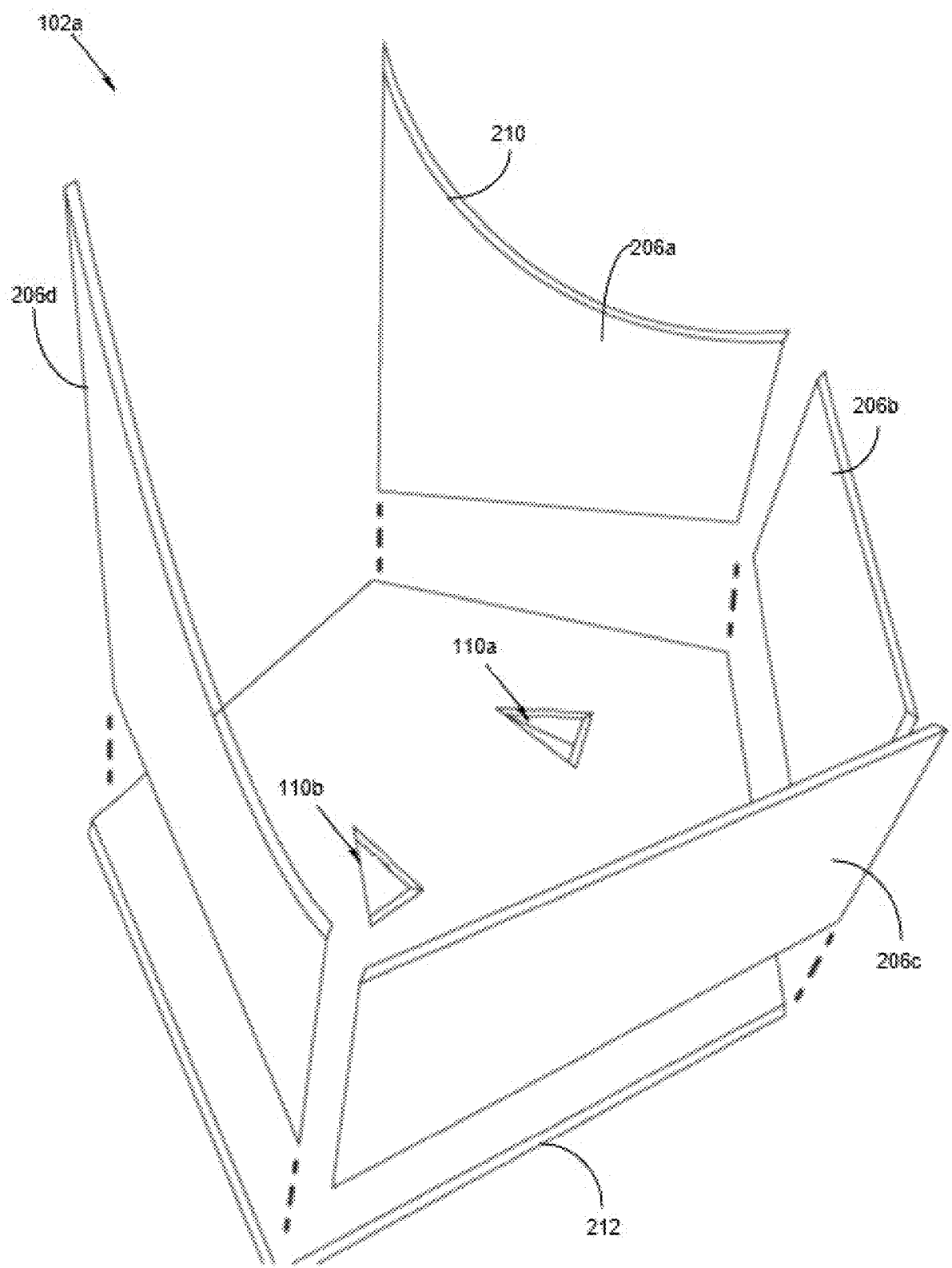
FIG. 5 illustrates a blow-up view of the pentagonal plant chamber, in accordance with an embodiment of the present invention.
Figure 6:
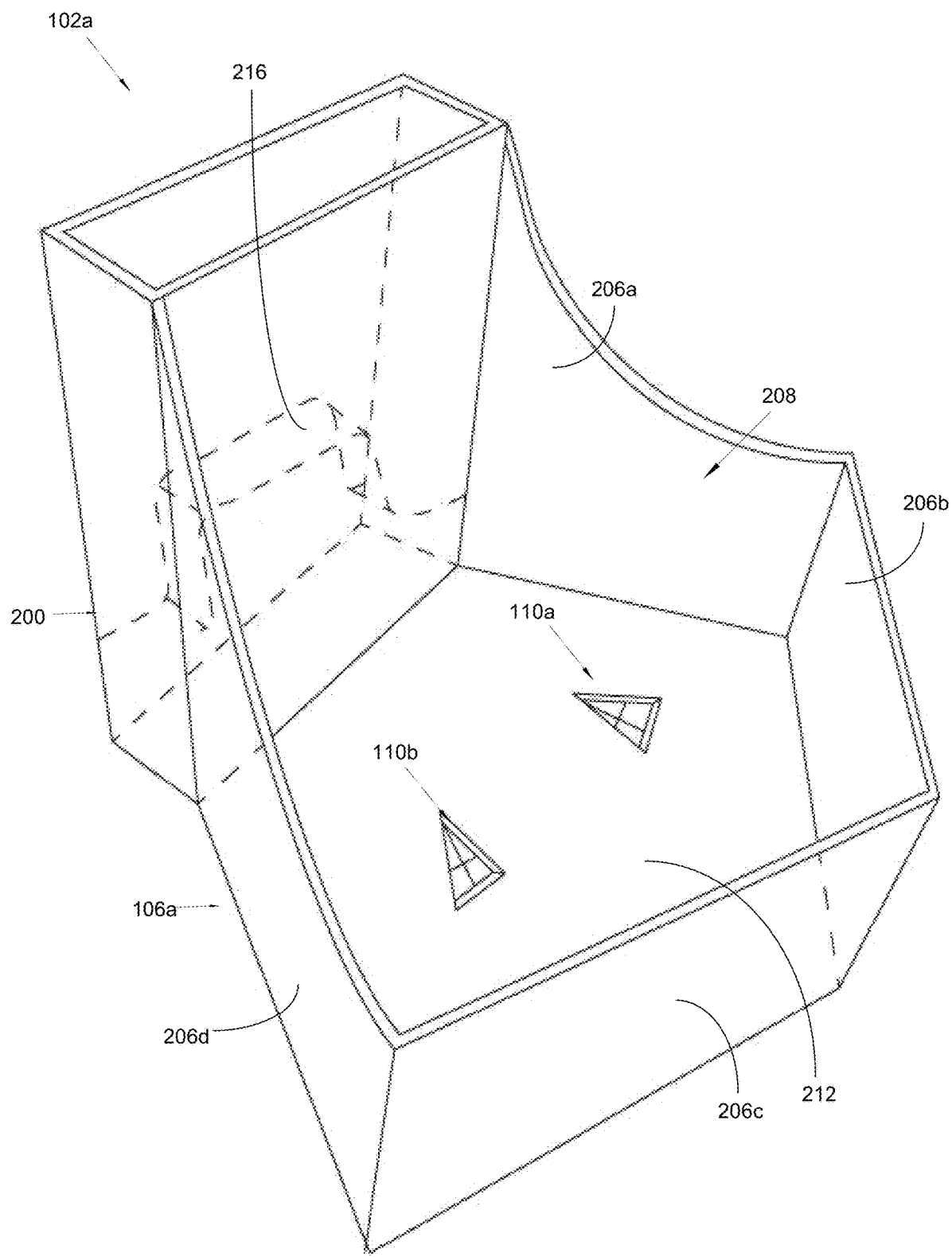
FIG. 6 illustrates a frontal view of the pentagonal plant chamber, showing the support block passing through a support sleeve, in accordance with an embodiment of the present invention.

As FIG. 5 illustrates, the pentagon-shaped plant chamber 106a, 106b is also defined by a floor wall 212, serving as the supportive platform for soil, nutrients, and water. The floor wall 212 is defined by at least one drainage hole 110a, 110b. The drainage hole 110a-b enables passage of excess nutrients and water that seep through the soil. In one non-limiting embodiment, the drainage hole 110a-b is defined by a grated configuration and a triangular shape (FIG. 6). In some embodiments, the drainage hole of the pentagon-shaped plant chamber 106a, 106b is disposed proximally to the junction of the sleeve sidewalls 204 and the chamber sidewalls 206a-d.

Figure 7:
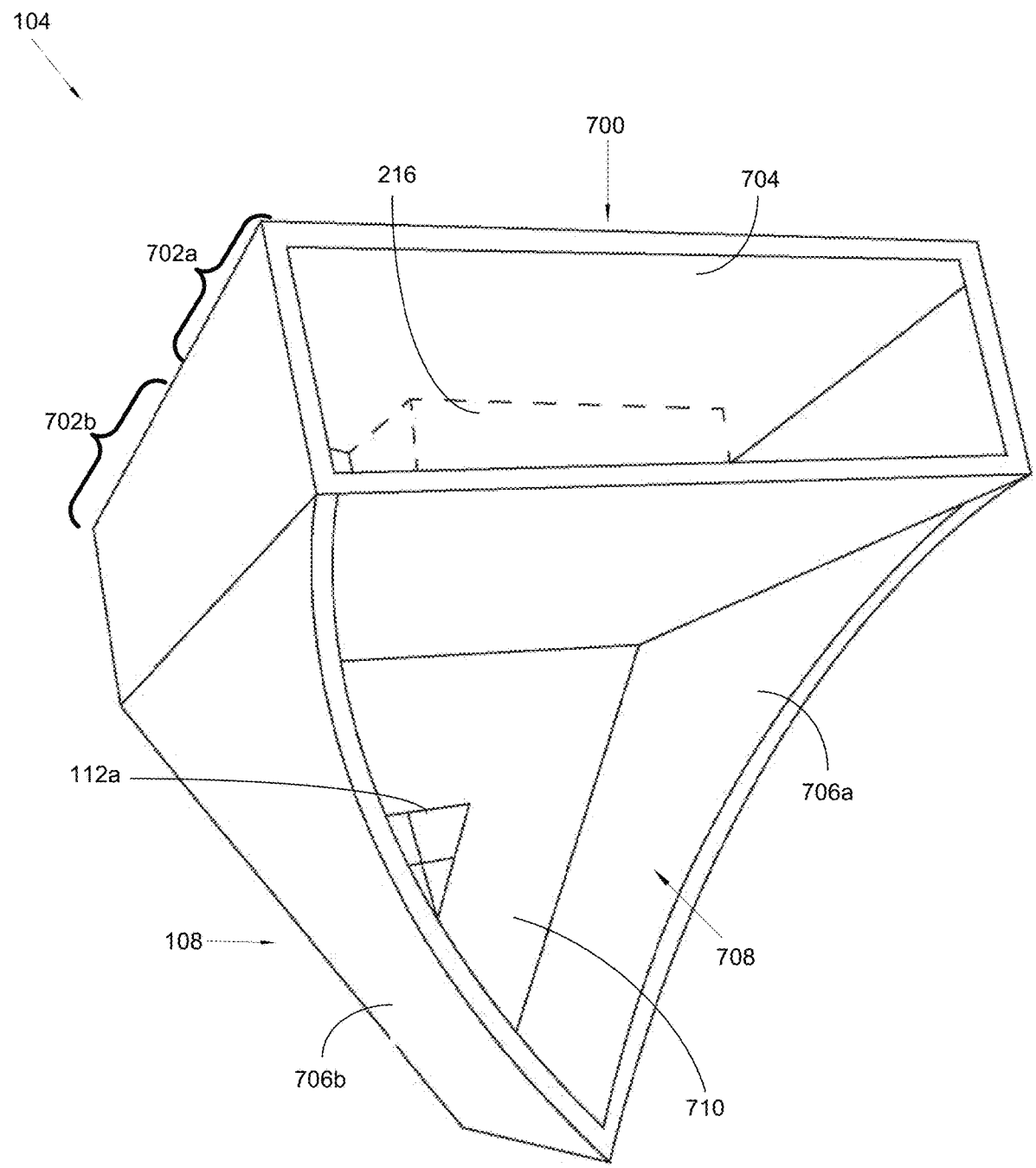
FIG. 7 illustrates an isometric view of an exemplary triangular plant chamber, in accordance with an embodiment of the present invention.

Turning now to FIG. 7, the assembly 100 also includes multiple triangular plant containers 104 that complement the pentagonal plant containers 102a, 102b. The triangular plant containers 104 comprise a triangle-shaped plant chamber 108 for holding soil, nutrients, and vegetation. The triangular plant containers 104 also include a triangle support sleeve 700 that is disposed in an adjacent relationship with the triangle-shaped plant chamber 108.

Figure 8:
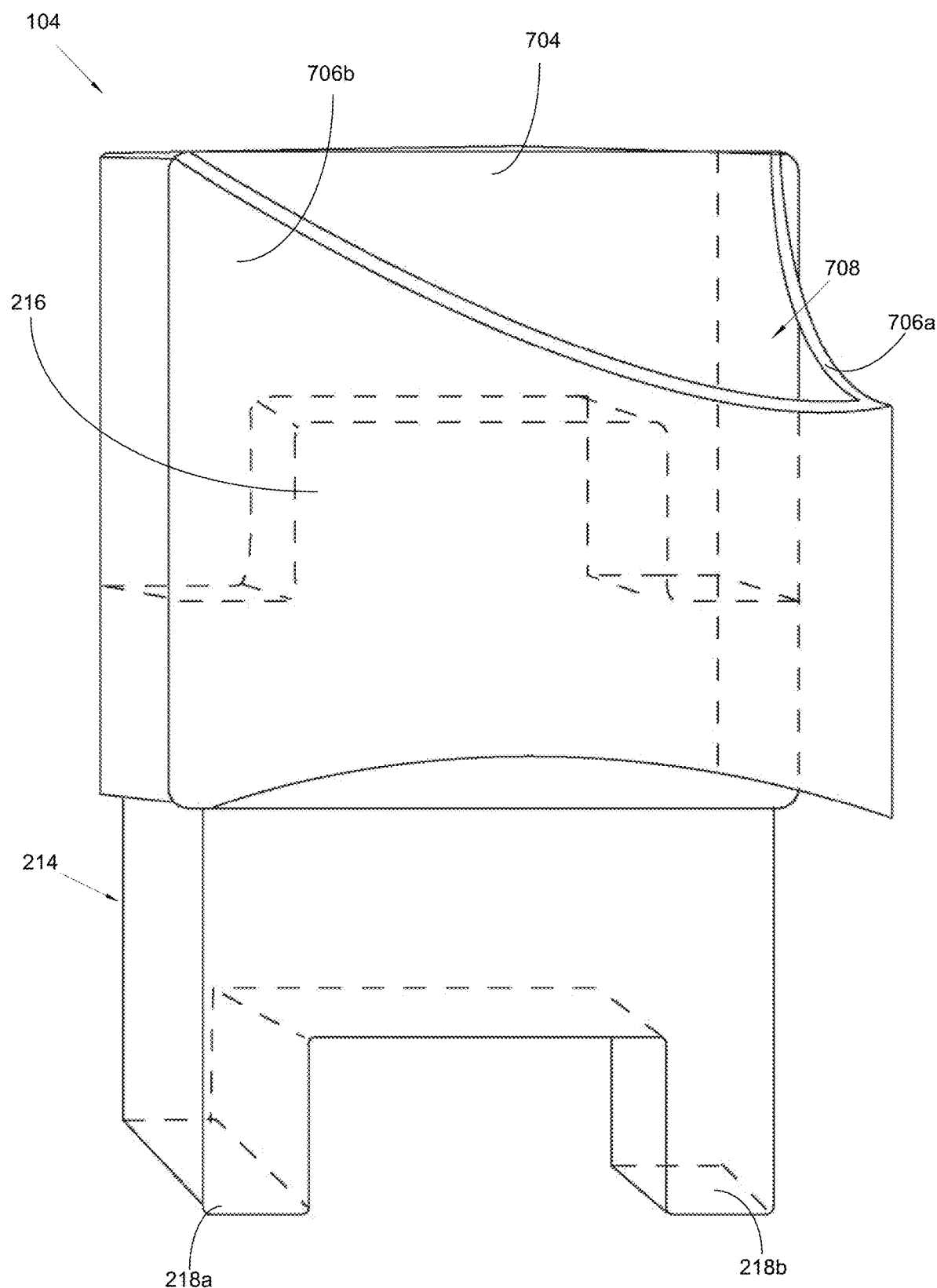
FIG. 8 illustrates an isometric view of the triangular plant chamber, and a support block passing through the triangle support sleeve, in accordance with an embodiment of the present invention.

As FIG. 8 illustrates, the triangle support sleeve 700 is defined by an upper section 702a and a lower section 702b. The upper section 702a may be oriented at a higher elevation than the lower section 702b. The triangle support sleeve 700 is also defined by multiple rectangular-shaped sleeve sidewalls 704. In one non-limiting embodiment, the sleeve sidewalls 704 of the triangle support sleeve 700 form a generally rectangular shape.

Figure 9:
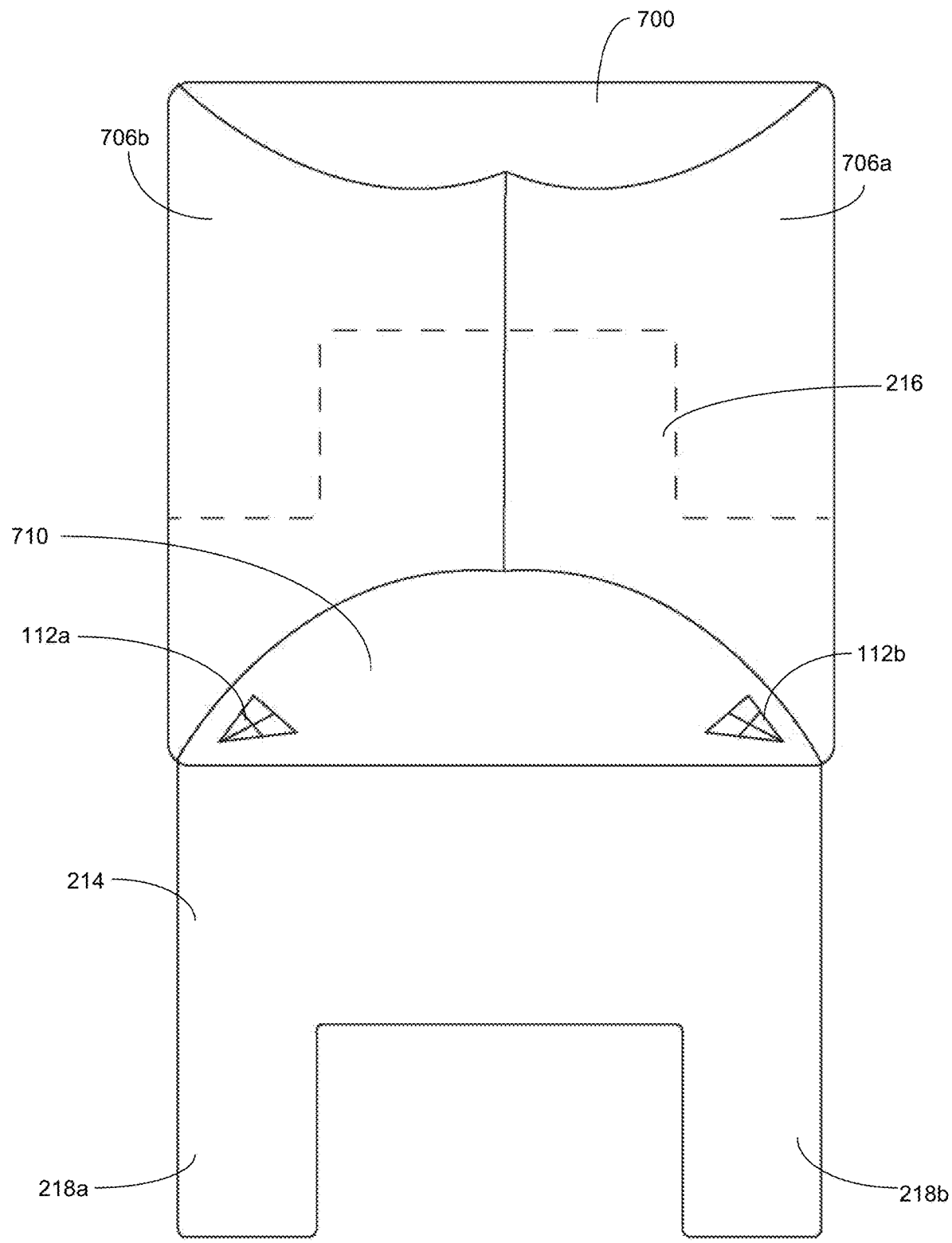
FIG. 9 illustrates frontal sectioned view of the triangular plant chamber, in accordance with an embodiment of the present invention.
Figure 10:
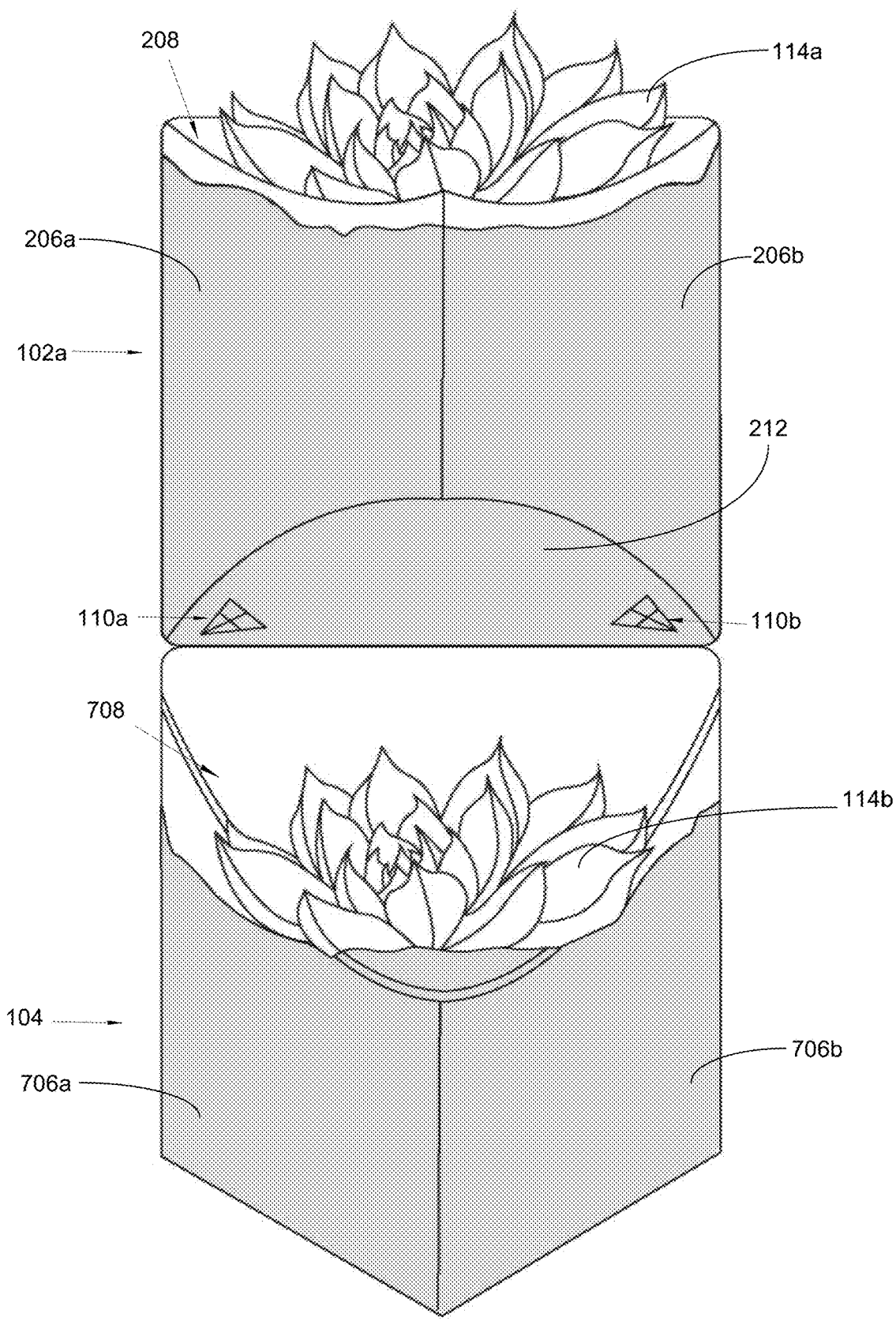
FIG. 10 illustrates an assembly of a pentagonal plant container stacked above a triangular plant container, in accordance with an embodiment of the present invention.

The triangle-shaped plant chamber 108 is also defined by multiple chamber sidewalls 706a, 706b that form a hollow interior 708 (FIG. 9). The chamber sidewalls 706a-b may include two chamber sidewalls that buttress the sleeve sidewalls 704 to create the triangle shape. The hollow interior is designed to hold soil, nutrients, and vegetation. In some embodiments, the chamber sidewalls 706a-b of the triangle-shaped plant chamber 108 have a thickness of ¼". Though other dimensions may be used in different embodiments of the triangle-shaped plant chamber 108.

The thickness of the chamber sidewalls 706a-b of the triangle-shaped plant chamber 108 allow the plant chambers to be cast in a multitude of materials that can be reduced to a liquid state and solidified within a mold including concrete, plaster, clays, resin, recycled plastics, metals and any composite wherein. Thus, by having the plant containers anchored to a flat sleeve sidewall, instead of a radial arrangement means, the assemblages of plant containers can readily be moved and rearranged. Having such a flat sleeve sidewall joined to the plant chambers 106ab, 108 eliminates the need for a radial arrangement for plant containers and allows for a greater and differential arrangement for all assemblages.

The triangle-shaped plant chamber 108 is also defined by a floor wall 710, which operates as the supportive platform for soil, nutrients, and water. The floor wall 710 of the triangle-shaped plant chamber 108 forms at least one drainage hole 112a, 112b. The drainage hole is defined by a grated configuration and a triangular shape. As in the floor wall 212 for the pentagon-shaped plant chamber 106a, 106b, the drainage hole releases excess moisture. Both drainage holes are aligned, so as to optimize water distribution between separate pant chambers. Thus, when the plant chambers are in a stacked arrangement, the drainage holes 110a-b of the pentagon-shaped plant chamber 106a, 106b align with the drainage holes 112a-b of the triangle-shaped plant chamber 108. This alignment allows the water to flow freely between plant chambers 106a-b, 108.

The plant chambers 106a-b have unique dimensions that optimize growth of the vegetation, and enable passage of sunlight by reducing shade from upper plant chambers. In one non-limiting embodiment shown in FIG. 10, the pentagon-shaped plant chamber 106a, 106b has half the width of the triangle-shaped plant chamber 108. In other embodiments, the pentagon-shaped plant chamber 106a, 106b has half the length of the triangle-shaped plant chamber 108. This reduced size allows sunlight to reach lower-disposed plant containers. The chamber sidewalls 206a-d of the pentagon-shaped plant chamber 106a, 106b and the triangle-shaped plant chamber 108 slope downwardly about 75°. The stacking unit of this embodiment includes a pentagonal-shaped chamber 106a-d with sloped chamber sidewalls 206a-d, which extend to half of the total depth of the triangulated embodiment of chamber sidewalls 706a-b.

The hollow interior 708 of the plant chamber 108 has a gradual slope upward and downward along the support chamber sidewalls. The minimum dimension for the center front of each plant chamber 106a-b, 108 is about 2½" high, with the chamber sidewalls gradually sloping upward and downward to the complete height of the support sleeve and the plant chamber. The sloped chamber sidewalls allow for a minimum of a 75° angle, and 4" of clearance between stacked plant containers placed directly above one another, allowing for ample growing room and clearance for optimal lighting conditions for the vegetation 114a, 114b, 114c. The sloped chamber sidewalls also allow gravity to naturally push excess water through the strategically placed drainage holes.

Looking again at FIG. 8, the assembly 100 also provides multiple support blocks 214 that fit into the support sleeves and mate together to hold the plant containers in the stacked arrangement. The support blocks 214 comprise a central upper tongue 216 detachably mated in a snug relationship with the lower sections of the pentagon support sleeve 200 and the triangle support sleeve 700. In this manner, the support blocks 214 engage a substantial surface area of the sleeve sidewalls.

By having the interlocking function of each plant container is distributed across the sides of the planter and offset along the center of the planter, causing the weight of the planting medium and vegetation shown in the stacking unit to be redistributed across the entirety of the support sleeve 200, 700. The support blocks further comprise a pair of spaced-apart lower legs that are detachably mated in a snug relationship with the upper sections of the pentagon support sleeve and the triangle support sleeve. The central upper tongue of a lower support block detachably mates in a snug relationship with the lower legs of an adjacent upper support block. In this manner, the support blocks retain the pentagonal and triangular plant containers in a stacked, self-supporting arrangement.

One advantage of this snug fit is that the addition of grooves, tongues, and legs instead of a flat extension creates additional points of contact throughout each support sidewall for all added plant containers, meaning that the points of weight stress will be redistributed, allowing for the weight to be equalized throughout an assembly of units without units tipping forward. In one non-limiting embodiment, the tongue extends three quarters of the width of the finished support structure, which is flanked by interlocking grooves which will be filled by the stacking legs of the plant container above.

Figure 11:
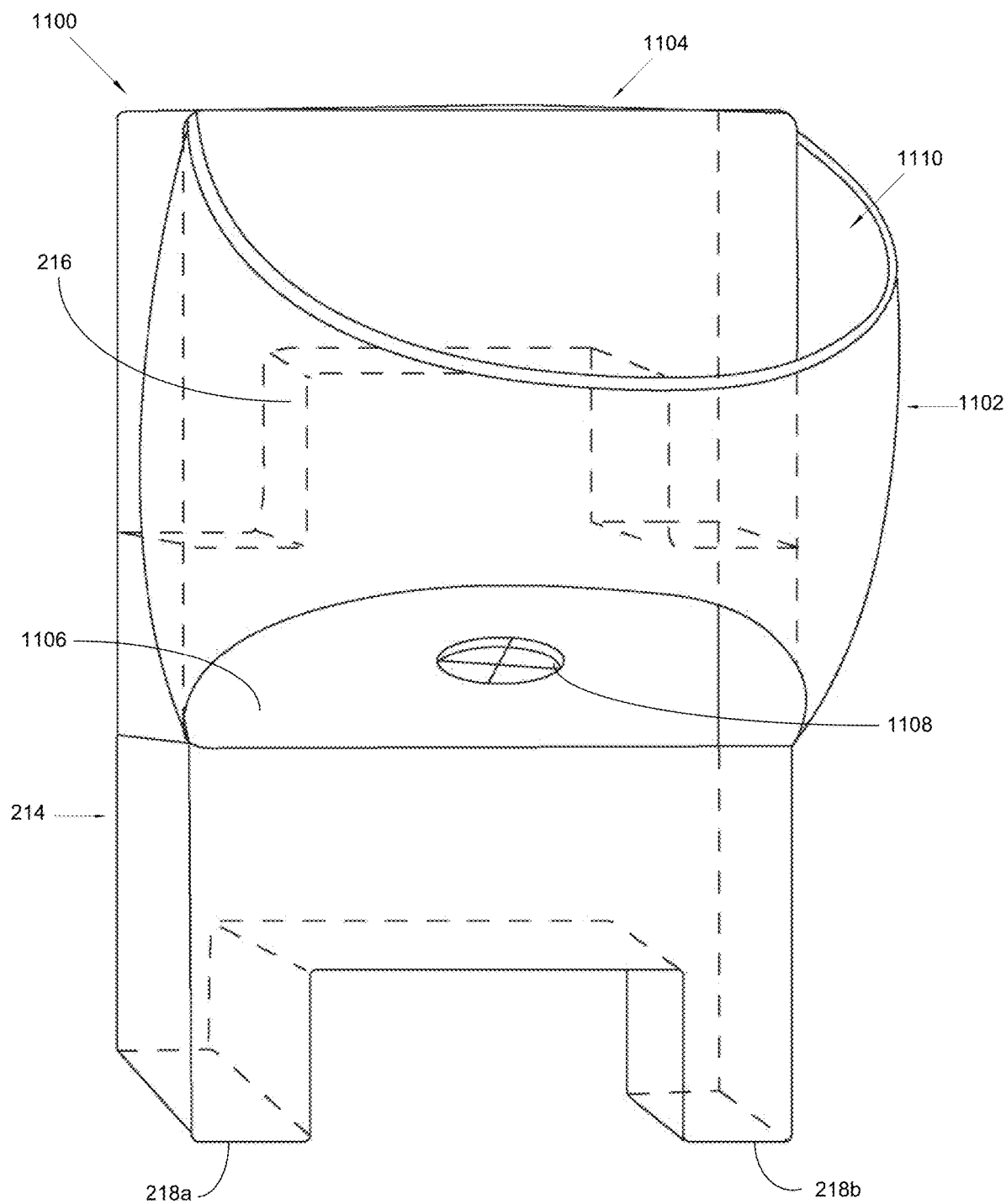
FIG. 11 illustrates an isometric view of an exemplary hyperbolic shaped plant container, in accordance with an embodiment of the present invention.
Figure 12:
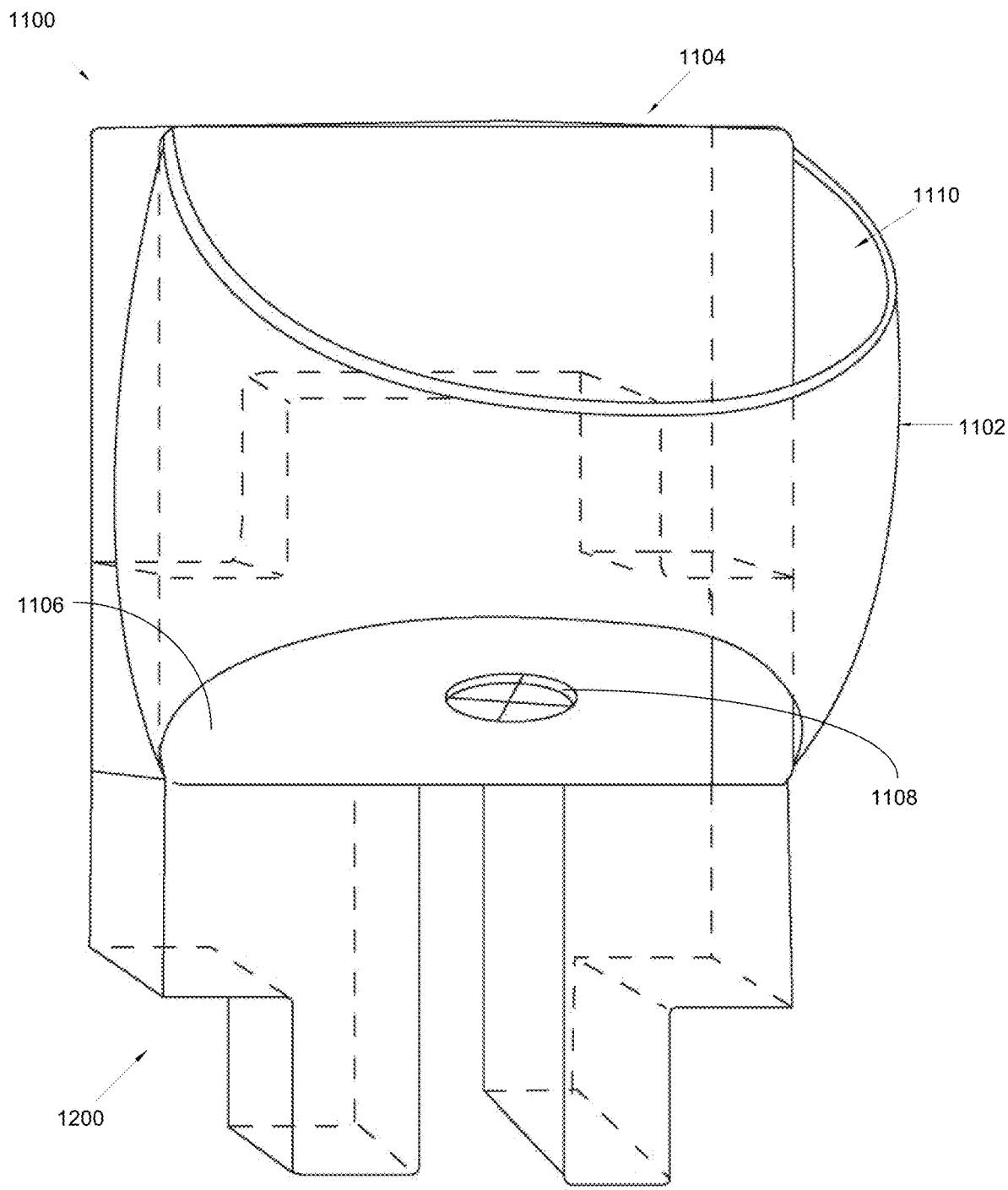
FIG. 12 illustrates an isometric view of the hyperbolic shaped plant container, supported by a support sleeve having inverted legs, in accordance with an embodiment of the present invention.

Turning now to FIG. 11, an alternative embodiment of the plant chambers provides a parabolic plant container 1100 that has a parabolic chamber sidewall 1102 defined by a parabolic, or bubble shape. The parabolic plant container 1100 includes a support sleeve 1104 for stacking, as in the prior embodiments. A floor wall 1106 support soil, water, and the vegetation. A hollow interior 1110 provides a space for sunlight and moisture to engage the vegetation inside the parabolic chamber sidewall 1100. A central drainage hole 1108 allows passage of the water to flow to lower plant chambers 106a, 108. And as discussed above, the support block 214 passes through support sleeve 1104 for stacking with adjacent plant containers 102a, 104. FIG. 12 illustrates an alternative embodiment of the support block 214 with two lower inverted legs, rather than the spaced-apart lower legs described above.

Figure 13:
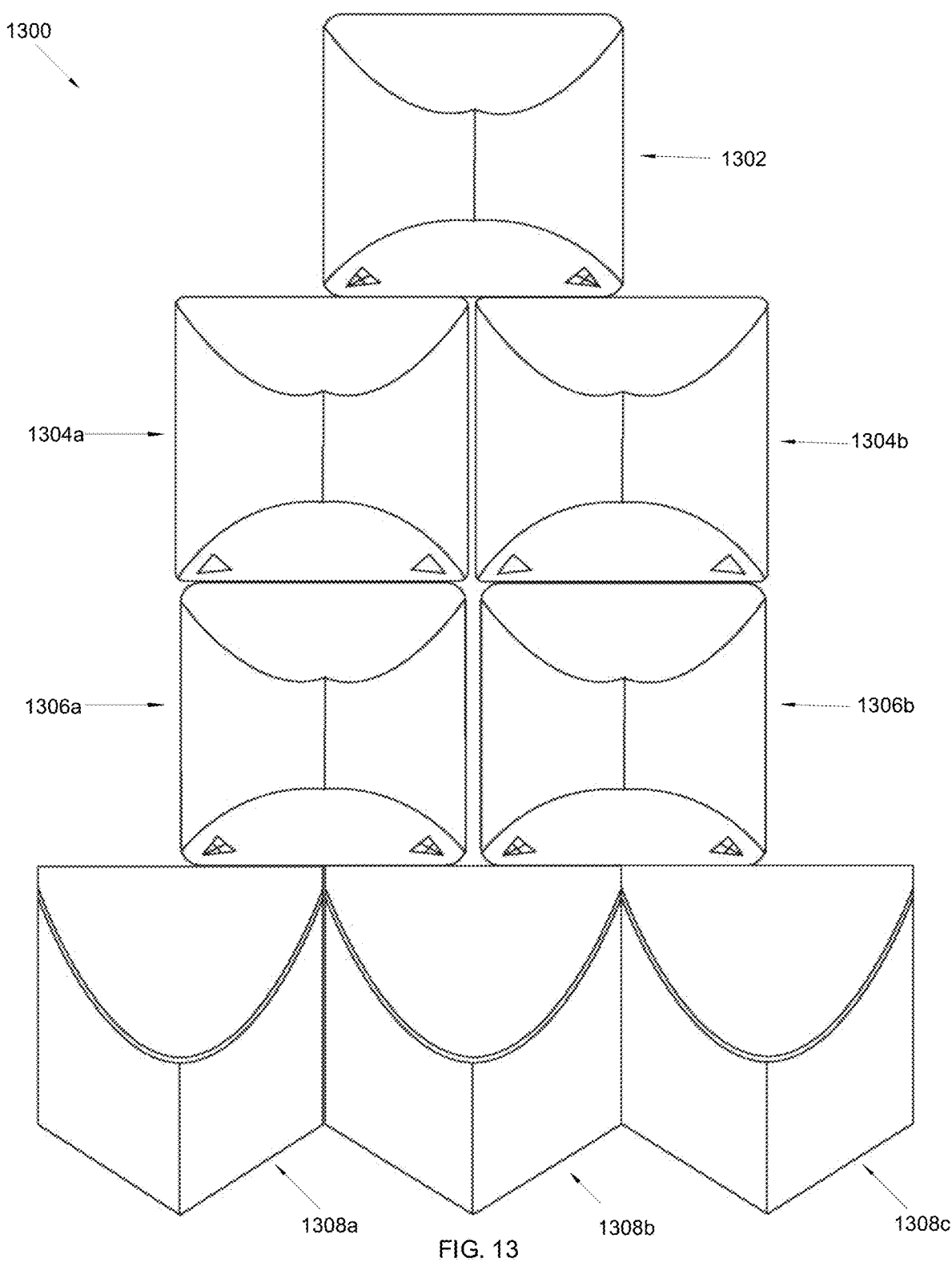
FIG. 13 illustrates an isometric view of an exemplary assembly of pentagonal and triangular plant containers, configured in a stacked combination of vertical arrangements, in accordance with an embodiment of the present invention Like reference numerals refer to like parts throughout the various views of the drawings.

Thus, as FIG. 13 shows, an assembly 1300 can have the plant containers configured in any combination of vertical arrangements. As illustrated, a top plant container 1302 contains vegetation. A pair of second tier triangular shaped plant containers 1304a, 1304b are stacked beneath plant container 1302 through use of support blocks 214. Continuing with the stacked configuration, pair of third tier triangular shaped plant containers 1306a, 1306b are stacked beneath triangular shaped plant containers 1304a, 1304b through use of support blocks 214. A foundation layer of triangle shaped plant containers 1308a, 1308b, 1308c rest on a ground surface and provide the foundation for assembly 1300.

In conclusion, the interlocking tongue and groove vegetation planting assembly 100 provides a self-supporting arrangement of pentagon-shaped plant containers and triangle-shaped plant containers that are alternatively stacked, and detachably fitted together with support blocks having a central tongue on one end and a pair of legs on an opposite end that fit together in a tongue-and-groove relationship through the support sleeve. Both the pentagon-shaped and triangle-shaped plant containers include a plant chamber, and an adjacent support sleeve. The plant chamber has multiple sidewalls sloped at an angle. The plant chamber also has a floor wall that forms drainage holes near the junction of the plant chamber and the support sleeve sidewalls. The pentagon-shaped plant container is half the width and length of the triangle-shaped plant container to allow sunlight to reach lower stacked triangle-shaped plant chambers. The tongue-and-groove stacking arrangement creates multiple points of contact throughout each sidewall for equal weight distribution.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An interlocking tongue and groove vegetation planting assembly, the assembly comprising:
    multiple pentagonal plant containers comprising a pentagon-shaped plant chamber and a pentagon support sleeve disposed in an adjacent relationship,
    the pentagon support sleeve for the pentagonal plant containers being defined by multiple sleeve sidewalls,
    the pentagon-shaped plant chamber being defined by multiple chamber sidewalls forming a hollow interior, the pentagon-shaped plant chamber further being defined by a floor wall forming at least one drainage hole;
    multiple triangular plant containers comprising a triangle-shaped plant chamber and a triangle support sleeve disposed in an adjacent relationship,
    the triangle support sleeve being defined by multiple sleeve sidewalls,
    the triangle-shaped plant chamber being defined by multiple chamber sidewalls forming a hollow interior, the triangle-shaped plant chamber further being defined by a floor wall forming at least one drainage hole; and
    multiple support blocks comprising a central upper tongue detachably mated in a snug relationship with the pentagon support sleeve and the triangle support sleeve, the support blocks further comprising a pair of spaced-apart lower legs detachably mated in a snug relationship with the pentagon support sleeve and the triangle support sleeve,
    whereby the central upper tongue and the lower legs detachably mate with the support blocks in a snug relationship,
    whereby the central upper tongue detachably mates with the lower legs in a snug relationship,
    whereby the support blocks retain the pentagonal and triangular plant containers in a stacked arrangement.

2. The assembly of claim 1, wherein the sleeve sidewalls of the pentagon-shaped plant chamber and the triangle-shaped plant chamber form a rectangular shape.

3. The assembly of claim 1, wherein the chamber sidewalls of the pentagon-shaped plant container comprise four chamber sidewalls.

4. The assembly of claim 1, wherein the chamber sidewalls of the triangle-shaped plant container comprise two chamber sidewalls.

5. The assembly of claim 1, wherein the chamber sidewalls have a tapered upper edge.

6. The assembly of claim 1, wherein the drainage hole of the pentagon-shaped plant chamber is disposed proximal to the junction of the sleeve sidewalls and the chamber sidewalls.

7. The assembly of claim 1, wherein the at least one drainage hole of the pentagon-shaped plant chamber is centrally disposed in the floor wall.

8. The assembly of claim 1, wherein the at least one drainage hole of the pentagon-shaped plant chamber and the triangle-shaped plant chamber are defined by a triangular shape.

9. The assembly of claim 1, wherein the at least one drainage hole of the pentagon-shaped plant chamber and the triangle-shaped plant chamber are grated.

10. The assembly of claim 1, at least a portion of the chamber sidewalls of the pentagon-shaped plant chamber align in a coplanar relationship with the chamber sidewalls of the triangle-shaped plant chamber when the plant containers are arranged in a stacked arrangement.

11. The assembly of claim 1, the drainage hole of the pentagon-shaped plant chamber aligns with the drainage hole of the triangle-shaped plant chamber when the plant chambers are in a stacked arrangement.

12. The assembly of claim 1, wherein the pentagon-shaped plant chamber has half the width of the triangle-shaped plant chamber.

13. The assembly of claim 1, wherein the pentagon-shaped plant chamber has half the length of the triangle-shaped plant chamber.

14. The assembly of claim 1, wherein the chamber sidewalls of the pentagon-shaped plant chamber and the triangle-shaped plant chamber slope downwardly about 75 degrees.

15. The assembly of claim 1, wherein the chamber sidewalls of the pentagon-shaped plant chamber and the triangle-shaped plant chamber have a thickness of about ¼ inches.

16. The assembly of claim 1, wherein the central upper tongue and the lower legs of the support blocks engage a substantial surface area of the sleeve sidewalls.

17. An interlocking tongue and groove vegetation planting assembly, the assembly comprising:
    multiple pentagonal plant containers comprising a pentagon-shaped plant chamber and a pentagon support sleeve disposed in an adjacent relationship,
    the pentagon support sleeve for the pentagonal plant containers being defined by an upper section and a lower section, the support sleeve further being defined by multiple rectangular-shaped sleeve sidewalls,
    the pentagon-shaped plant chamber being defined by multiple chamber sidewalls forming a hollow interior, the pentagon-shaped plant chamber further being defined by a floor wall forming at least one drainage hole defined by a grated configuration and a triangular shape;

multiple triangular plant containers comprising a triangle-shaped plant chamber and a triangle support sleeve disposed in an adjacent relationship, the triangle support sleeve being defined by an upper section and a lower section, the support sleeve further being defined by multiple rectangular-shaped sleeve sidewalls, the triangle-shaped plant chamber being defined by multiple chamber sidewalls forming a hollow interior, the triangle-shaped plant chamber further being defined by a floor wall forming at least one drainage hole defined by a grated configuration and a triangular shape, whereby the pentagon-shaped plant chamber has half the width of the triangle-shaped plant chamber, whereby the chamber sidewalls of the pentagon-shaped plant chamber and the triangle-shaped plant chamber slope downwardly about 75 degrees; and multiple support blocks comprising a central upper tongue detachably mated in a snug relationship with the lower sections of the pentagon support sleeve and the triangle support sleeve, the support blocks further comprising a pair of spaced-apart lower legs detachably mated in a snug relationship with the upper sections of the pentagon support sleeve and the triangle support sleeve, whereby the central upper tongue detachably of a lower support block mates in a snug relationship with the lower legs of an adjacent upper support block, whereby the support blocks retain the pentagonal and triangular plant containers in a stacked arrangement.

18. The assembly of claim 17, wherein the drainage hole of the pentagon-shaped plant chamber is disposed proximal to the junction of the sleeve sidewalls and the chamber sidewalls.

19. The assembly of claim 17, wherein the chamber sidewalls have a tapered upper edge.

20. An interlocking tongue and groove vegetation planting assembly, the assembly consisting of:

multiple pentagonal plant containers comprising a pentagon-shaped plant chamber and a pentagon support sleeve disposed in an adjacent relationship, the pentagon support sleeve for the pentagonal plant containers being defined by an upper section and a lower section, the support sleeve further being defined by multiple rectangular-shaped sleeve sidewalls, the pentagon-shaped plant chamber being defined by multiple chamber sidewalls forming a hollow interior, the pentagon-shaped plant chamber further being defined by a floor wall forming at least one drainage hole defined by a grated configuration and a triangular shape;

multiple triangular plant containers comprising a triangle-shaped plant chamber and a triangle support sleeve disposed in an adjacent relationship, the triangle support sleeve for the triangular plant containers being defined by an upper section and a lower section, the support sleeve further being defined by multiple rectangular-shaped sleeve sidewalls, the triangle-shaped plant chamber being defined by multiple chamber sidewalls forming a hollow interior, the triangle-shaped plant chamber further being defined by a floor wall forming at least one drainage hole defined by a grated configuration and a triangular shape, whereby the pentagon-shaped plant chamber has half the width of the triangle-shaped plant chamber, whereby the chamber sidewalls of the pentagon-shaped plant chamber and the triangle-shaped plant chamber slope downwardly about 75 degrees, whereby the drainage hole of the pentagon-shaped plant chamber is disposed proximal to the junction of the sleeve sidewalls and the chamber sidewalls; and multiple support blocks comprising a central upper tongue detachably mated in a snug relationship with the lower sections of the pentagon support sleeve and the triangle support sleeve, the support blocks further comprising a pair of spaced-apart lower legs detachably mated in a snug relationship with the upper sections of the pentagon support sleeve and the triangle support sleeve, whereby the central upper tongue detachably of a lower support block mates in a snug relationship with the lower legs of an adjacent upper support block, whereby the support blocks retain the pentagonal and triangular plant containers in a stacked arrangement.

* * * * *